United States Patent
McCoy et al.

(10) Patent No.: US 10,979,971 B2
(45) Date of Patent: Apr. 13, 2021

(54) NETWORK EDGE CONTROLLER AND REMOTE FIELD SERVICE SYSTEM

(71) Applicant: Apptricity Corporation, Irving, TX (US)

(72) Inventors: Ralph McCoy, Irving, TX (US); Tim Garcia, Colleyville, TX (US)

(73) Assignee: APPTRICITY CORPORATION, Irving, TX (US)

( * ) Notice: Subject to any disclaimer, the term of this patent is extended or adjusted under 35 U.S.C. 154(b) by 46 days.

(21) Appl. No.: 16/490,007

(22) PCT Filed: Jul. 6, 2018

(86) PCT No.: PCT/US2018/041142
§ 371 (c)(1),
(2) Date: Aug. 29, 2019

(87) PCT Pub. No.: WO2019/010450
PCT Pub. Date: Jan. 10, 2019

(65) Prior Publication Data
US 2019/0394720 A1 Dec. 26, 2019

Related U.S. Application Data

(60) Provisional application No. 62/641,627, filed on Mar. 12, 2018, provisional application No. 62/529,894, filed on Jul. 7, 2017.

(51) Int. Cl.
*H04W 48/18* (2009.01)
*H04W 4/44* (2018.01)
(Continued)

(52) U.S. Cl.
CPC ............. *H04W 48/18* (2013.01); *H04L 12/12* (2013.01); *H04W 4/029* (2018.02); *H04W 4/44* (2018.02); *H04W 4/80* (2018.02)

(58) Field of Classification Search
CPC ......... H04W 48/18; H04W 4/80; H04W 4/44; H04W 4/029; H04L 12/12
See application file for complete search history.

(56) References Cited

U.S. PATENT DOCUMENTS

| | | | |
|---|---|---|---|
| 5,633,875 A | 5/1997 | Hershey et al. | |
| 6,249,227 B1 | 6/2001 | Brady et al. | |

(Continued)

FOREIGN PATENT DOCUMENTS

| | | |
|---|---|---|
| CA | 2985243 A1 | 2/2017 |
| EP | 1188115 B1 | 8/2006 |

OTHER PUBLICATIONS

International Searching Authority: Notification of Transmittal of International Search Report, Written Opinion of Int'l Searching Authority, or the Declaration dated Oct. 29, 2018.
(Continued)

*Primary Examiner* — Jamal Javaid
(74) *Attorney, Agent, or Firm* — Hemingway & Hansen, LLP

(57) ABSTRACT

The present invention is machine-to-machine (M2M) mobile platform that has a controller that can communicate with RFID tags and receives RFID information into a mobile vehicle foreign network with an all-in-one mobile solution and also communicates with a home network having a computer server. The present invention provides an integrated command and communication platform to support communications by cell phone, WiFi, GPS, RFID controller, vehicle information controller, and real-time integration to optimize performance of the remote tracking network. With the use of the present invention, fleet services, mobile inventory, and asset tracking can be efficiently organized and conducted across a fleet vehicles, a multitude of remote tracking devices, and geographically around the world.

36 Claims, 8 Drawing Sheets

(51) Int. Cl.
*H04W 4/029* (2018.01)
*H04W 4/80* (2018.01)
*H04L 12/12* (2006.01)

(56) References Cited

U.S. PATENT DOCUMENTS

| | | | |
|---|---|---|---|
| 6,687,609 | B2 | 2/2004 | Hsiao et al. |
| 6,977,612 | B1 | 12/2005 | Bennett |
| 7,072,668 | B2 | 7/2006 | Chow |
| 7,099,770 | B2 | 8/2006 | Naden et al. |
| 7,518,502 | B2 | 4/2009 | Austin et al. |
| 7,895,131 | B2 | 2/2011 | Kraft |
| 7,928,844 | B2 | 4/2011 | Mackenzie et al. |
| 8,223,009 | B2 | 7/2012 | Anderson et al. |
| 8,239,251 | B2 | 8/2012 | Wellman |
| 8,339,251 | B2 | 12/2012 | Roberts, Sr. et al. |
| 8,890,683 | B2 | 11/2014 | Schnitz et al. |
| 9,082,102 | B2 | 7/2015 | Taylor et al. |
| 9,111,433 | B2 | 8/2015 | Curatolo et al. |
| 9,456,302 | B2 | 9/2016 | Skomra et al. |
| 9,519,921 | B2 | 12/2016 | Wei et al. |
| 9,591,441 | B2 | 3/2017 | Kuhl et al. |
| 9,633,576 | B2 | 4/2017 | Reed |
| 9,635,518 | B2 | 4/2017 | Lee et al. |
| 9,641,964 | B2 | 5/2017 | Kulkarni et al. |
| 9,723,552 | B2 | 8/2017 | Farley et al. |
| 9,756,684 | B2 | 9/2017 | Tammisetti |
| 2006/0187026 | A1 | 8/2006 | Kochis |
| 2007/0046467 | A1 | 3/2007 | Chakraborty et al. |
| 2010/0228585 | A1 | 9/2010 | Bradley |
| 2011/0285535 | A1 | 11/2011 | Barwin |
| 2012/0127976 | A1 | 5/2012 | Lin et al. |
| 2013/0060351 | A1 | 3/2013 | Imming et al. |
| 2016/0379165 | A1 | 12/2016 | Moakley |
| 2017/0031840 | A1 | 2/2017 | Cawse et al. |
| 2017/0208426 | A1 | 7/2017 | Komoni et al. |

OTHER PUBLICATIONS

International Searching Authority: International Search Report dated Oct. 29, 2018.
International Searching Authority: Written Opinion of the International Searching Authority dated Oct. 29, 2018.
"The Internet of Things Architecture", I TU-T Draft: Study Period 2013-2016, International Communication Union, Geneva; CH, vol. m2m, Jun. 27, 2012, pf 1-144, XP044097902, para 3.1.3.1, 4.2.3, 4.2.6, 5.2.2, 5.3.3.1.

NETWORK EDGE CONTROLLER AND REMOTE FIELD SERVICE SYSTEM

CROSS-REFERENCE TO RELATED APPLICATIONS

This application is related to U.S. Provisional Patent Application Ser. No. 62/529,894 filed on Jul. 7, 2017 and Provisional Patent Application Ser. No. 62/641,627 filed on Mar. 12, 2018, and priority is claimed for these earlier filings under 35 U.S.C. § 119(e). These Provisional patent applications are also incorporated by reference into this utility patent application.

TECHNICAL FIELD OF THE INVENTION

The present invention relates to a network edge controller and mobile communication remote field service system.

BACKGROUND OF THE INVENTION

Computers and computer networks have transformed the society and the work environment since their introduction in mass to the business community and the consuming public. The impact we see today on the way business is conducted and consumers interact with service providers and product retailers is rooted in the technological developments in the recent past.

Present-day Internet communications represent the synthesis of technical developments begun in the 1960s—the development of a system to support communications between different United States military computer networks, and the subsequent development of a system to support the communication between research computer networks at United States universities. These technological developments would subsequently revolutionize the world of computing.

The Internet, like so many other high tech developments, grew from research originally performed by the United States Department of Defense. In the 1960s, Defense Department officials began to notice that the military was accumulating a large collection of computers—some of which were connected to large open computer networks and others that were connected to smaller closed computer networks. A network is a collection of computers or computer-like devices communicating across a common transmission medium. Computers on the Defense Department's open computer networks, however, could not communicate with the other military computers on the closed systems.

In the 1960s, the Defense Department developed a communication system that would permit communication between these different computer networks. Recognizing that a single, the Defense Department recognized that developing a centralized communication system would be vulnerable to attacks or sabotage, so the Defense Department required that their new communication system be decentralized with no critical services concentrated in vulnerable failure points. In order to achieve this goal, the Defense Department established a decentralized communication protocol for communication between their computer networks.

A few years later, the National Science Foundation (NSF) established a communication system that facilitated communication between incompatible network computers at various research institutions across the country. The NSF adopted the Defense Department's protocol for communication, and this combination of research computer networks would eventually evolve into the Internet.

The Defense Department's communication protocol governing data transmission between different networks was called the Internet Protocol (IP) standard. The IP standard has been widely adopted for the transmission of discrete information packets across network boundaries. In fact, the IP standard is the standard protocol governing communications between computers and networks on the Internet.

The IP standard identifies the types of services to be provided to users and specifies the mechanisms needed to support these services. The IP standard also specifies the upper and lower system interfaces, defines the services to be provided on these interfaces, and outlines the execution environment for services needed in the system.

A transmission protocol, called the Transmission Control Protocol (TCP), was developed to provide connection-oriented, end-to-end data transmission between packet-switched computer networks. The combination of TCP with IP (TCP/IP) forms a suite of protocols for information packet transmissions between computers on the Internet. The TCP/IP standard has also become a standard protocol for use in all packet switching networks that provide connectivity across network boundaries.

In a typical Internet-based communication scenario, data is transmitted from an originating communication device on a first network across a transmission medium to a destination communication device on a second network. After receipt at the second network, the packet is routed through the network to a destination communication device. Because standard protocols are used in Internet communications, the IP protocol on the destination communication device decodes the transmitted information into the original information transmitted by the originating device.

A computer operating on a network is assigned a unique physical address under the TCP/IP protocols. This is called an IP address. The IP address can include: (1) a network ID and number identifying a network, (2) a sub-network ID number identifying a substructure on the network, and (3) a host ID number identifying a particular computer on the sub-network. A header data field in the information packet will include source and destination addresses. The IP addressing scheme imposes a consistent addressing scheme that reflects the internal organization of the network or sub-network.

A router, agent or gateway is used to regulate the transmission of information packets into and out of the computer network. Routers interpret the logical address contained in information packet headers and direct the information packets to the intended destination. Information packets addressed between computers on the same network do not pass through the router to the greater network, and as such, these information packets will not clutter the transmission lines of the greater network. If data is addressed to a computer outside the network, the router forwards the data onto the greater network.

Mobile communications and cellular telephony systems have become smaller, lighter, and more powerful, which improved the ability to communicate with individuals on an exponential basis. The Internet protocols were originally developed with an assumption that Internet users would be connected to a single, fixed network. With the advent of cellular wireless communication systems, such as mobile communication devices, the movement of Internet users within a network and across network boundaries has become common. Because of this highly mobile Internet usage, the implicit design assumption of the Internet protocols (e.g. a fixed user location) is violated by the mobility of the user.

The IP-based mobile system includes at least one Mobile Node in a wireless communication system. The term "Mobile Node" includes a mobile communication unit, and, in addition to the Mobile Node, the communication system has a home network and a foreign network. The Mobile Node may change its point of attachment to the Internet through these other networks, but the Mobile Node will normally be associated with a single Mobile Node home network for IP addressing purposes. The home network has a Home Agent and the foreign network has a Foreign Agent—both of which control the routing of information packets into and out of their network.

The Mobile Node usually keeps the Home Agent informed of its current location by registering a care-of address with the Home Agent, and a care-of address represents the current foreign network where the Mobile Node is located. If the Home Agent receives an information packet addressed to the Mobile Node while the Mobile Node is located on a foreign network, the Home Agent will "tunnel" the information packet to the Mobile Node's current location on the foreign network via the applicable care-of address. The Foreign Agent may also participate in informing the Home Agent of the Mobile Node's current care-of address. The Foreign Agent can de-tunnel information packets for the mobile node after the information packets have been forwarded to the Foreign Agent by the Home Agent. Further, the Foreign Agent serves as a default router for out-going information packets generated by the mobile node while connected to the foreign network.

In an IP-based mobile communication system, the mobile communication device (e.g. cellular phone, pager, computer, etc.) can be called a Mobile Node. Typically, a Mobile Node maintains connectivity to its home network through a foreign network. The Mobile Node will always be associated with its home network for IP addressing purposes and will have information routed to it by routers located on the home and foreign networks. The routers can be referred to by a number of names including Home Agent, Home Mobility Manager, Home Location Register, Foreign Agent, Serving Mobility Manager, Visited Location Register, and Visiting Serving Entity. Mobile communication systems have used radio frequency identification tags and devices to track and monitor vehicles and other items, and these systems and methods allow for the communication between a host computer and a plurality of RFID transponders (sometimes called tags) through one or more interrogator units.

In an IP-based mobile communications system, the Mobile Node changes its point of attachment to the network while maintaining network connectivity. Most Mobile IP Protocols used today assume that mobile IP communications with a Mobile Node will be performed on a single administrative domain or a single network controlled by one administrator. When a Mobile Node travels outside its home administrative domain, however, the Mobile Node must communicate through multiple domains in order to maintain network connectivity with its home network. While connected to a foreign network controlled by another administrative domain, network servers must authenticate, authorize and collect accounting information for services rendered to the Mobile Node.

Wireless communication systems could include multiband radio architectures, systems capable of spectrum re-farming and software defined radio systems. Common system components in a wireless communication system, such as an IP-based mobile system, include at least one mobile node (or user equipment) and at least one access point AP or a basestaion (eNodeB or eNB) on a wireless communication system. The various components on these systems may be called different names depending on the nomenclature used on any particular network configuration or communication system.

For the purposes of this application, the term "mobile node" includes a mobile communication unit that is called mobile terminal, "smart phones," or nomadic devices such as laptop PCs with wireless connectivity. A "mobile node" or "user equipment" also encompasses PC's having cabled (e.g., telephone line ("twisted pair"), Ethernet cable, optical cable, and so on) connectivity to the wireless network, as well as wireless connectivity directly to the cellular network, as can be experienced by various makes and models of mobile terminals ("cell phones") having various features and functionality, such as Internet access, e-mail, messaging services, and the like.

"Mobile nodes" may sometimes be referred to as user equipment, mobile unit, mobile terminal, mobile device, or similar names depending on the nomenclature adopted by particular system providers. A "receiver" and "transmitter" is located at each "access point" (AP), "basestation," or "user equipment." As such, terms such as transmitter or receiver in the present invention are not meant to be restrictively defined, but could include components on each mobile communication unit or transmission device located on the network.

Several patents and patent publications show traditional methods of using computer networks and mobile connectivity for fleet managements and tracking assets, such as the following: (1) US Patent Publication No. 20170208426 published Jul. 20, 2017 to Komoni et al.; (2) US Patent Publication No. 2017/0031840 published Feb. 2, 2017 to Cawse; (3) US Publication No. 2016/0379165 published Dec. 29, 2016 to Moakley; (4) US Publication No. 2010/0228585 published Sep. 9, 2010 to Bradley; (5) U.S. Pat. No. 9,756,684, issued Sep. 5, 2017 to Tammisetti; (6) U.S. Pat. No. 9,723,552, issued Aug. 1, 2017 to Farley; (7) U.S. Pat. No. 9,641,964 issued May 2, 2017 to Kulkami et al.; (8) U.S. Pat. No. 9,635,518 issued Apr. 25, 2017 to Lee et al.; (9) U.S. Pat. No. 9,633,576 issued Apr. 25, 2017 to Reed; (10) U.S. Pat. No. 9,591,441 issued Mar. 3, 2017 to Kuhl; (11) U.S. Pat. No. 9,519,921 issued Dec. 13, 2016 to Wei et al.; (12) U.S. Pat. No. 9,456,302 issued Sep. 27, 2016 to Skomra et al.; (13) U.S. Pat. No. 9,111,433 issued on Aug. 18, 2015 to Curatolo; (14) U.S. Pat. No. 9,082,102 issued on Jul. 14, 2015 to Taylor et al.; (15) U.S. Pat. No. 8,890,683 issued Nov. 18, 2014 to Schnitz et al.; (16) U.S. Pat. No. 8,339,251 issued on Dec. 25, 2012 to Roberts Sr. et al.; (17) U.S. Pat. No. 8,239,251 issued Aug. 7, 2012 to Wellman; (18) U.S. Pat. No. 8,223,009 issued Jul. 17, 2012 to Anderson et al.; (19) U.S. Pat. No. 7,928,844 issued Apr. 19, 2011 to Mackenzie et al.; (20) U.S. Pat. No. 7,895,131 issued Feb. 22, 2011 to Kraft; (21) U.S. Pat. No. 7,518,502 issued Apr. 14, 2009 to Austin et al.; (22) U.S. Pat. No. 7,099,770 issued Aug. 29, 2006 to Naden et al.; (23) U.S. Pat. No. 7,072,668 issued Jul. 4, 2006 to Chow; (24) U.S. Pat. No. 6,977,612 issued Dec. 20, 2005 to Bennett; (25) U.S. Pat. No. 6,687,609 issued Feb. 3, 2004 to Hsiao et al.; (26) U.S. Pat. No. 6,249,227 issued Jun. 19, 2001 to Brady et al.; and (27) U.S. Pat. No. 5,633,875 issued May 27, 1995 to Hershey et al.

Prior art communication systems, including the above prior art methods and systems (including known RFID communication systems and methods) are not optimized to adequately operate in the mobile environment with efficiency. These systems, by and large, do not effectively and efficiently utilize the capabilities of the RFID systems to communicate and track assets. There is no present system that satisfactorily correlates and associates various features and capabilities of the mobile communication system to provide fully integrated, feature rich, and built-in data and information sharing with a maximum number of multiple input-output ports.

SUMMARY OF THE INVENTION

Figure 1:
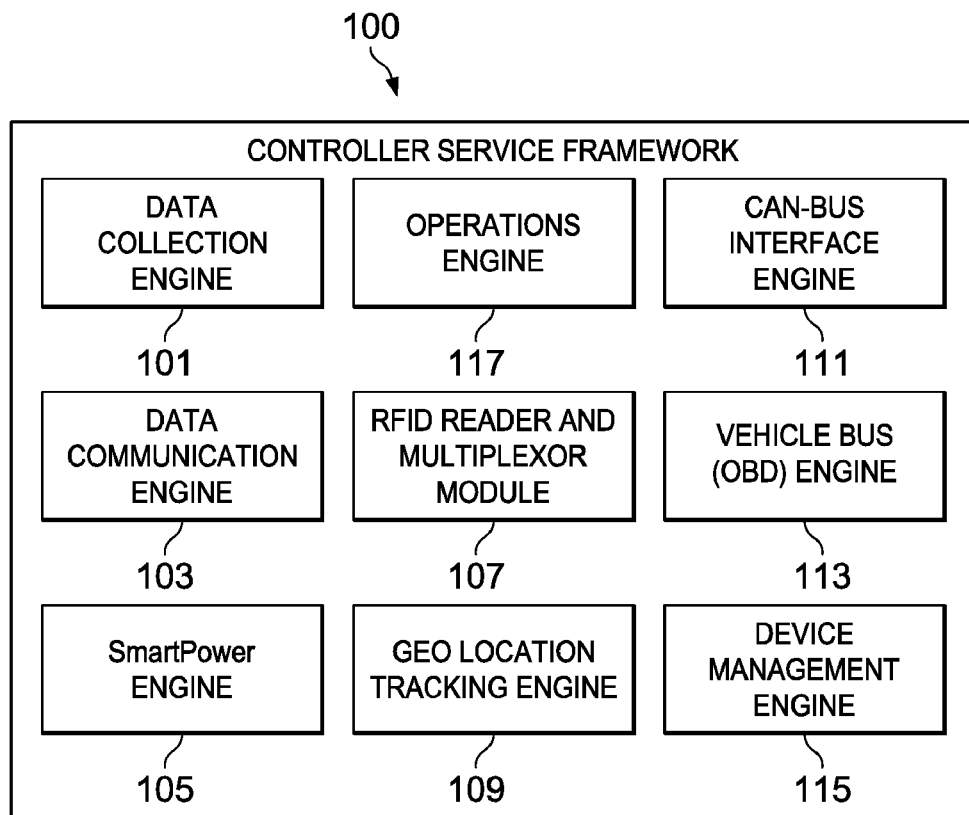
FIGS. 1-10 are block diagrams showing controller system framework and functional components used with the present invention.

The present invention is machine-to-machine (M2M) mobile platform that has a controller that can communicate with RFID tags and receives RFID information into a mobile vehicle foreign network with an all-in-one mobile solution and also communicates with a home network having a computer server. The present invention provides an integrated command and communication platform to support communications by cell phone, WiFi, GPS, RFID controller, vehicle information controller, and real-time integration to optimize performance of the remote tracking network. With the use of the present invention, fleet services, mobile inventory, and asset tracking can be efficiently organized and conducted across a fleet vehicles, a multitude of remote tracking devices, and geographically around the world.

The architecture of the present invention seamlessly supports changes in evolving communication standards, such as constantly evolving RFID standards and other innovations, and the system includes vehicle-mounted components that are coupled a bulkhead wall of a vehicle or elsewhere where there are connections to the vehicle power. The mobile vehicle network can select one of multiple external access points and communication channels, such as a cellular system or the Internet, to perform data transfer to the host computer network, and a communication protocol (such as Bluetooth) may allow pairing to mobile devices (e.g., tablet, etc.) for monitoring or control of the remote vehicle network and the RFID tags coupled to that mobile vehicle network. In the present invention, the mobile vehicle network can also be place on a stationary foreign network support platform.

With the invention, the RFID data transmitted to and through the mobile vehicle network has greater throughput and less interference compared to transmissions from RFID transponders to prior interrogator units, which increases the spatial area available for RFID coverage and permits a larger number of RFID transponders to be used on the system, among various other advantages. The present invention is a system and method the supports improved the tracking of an increased number of RFID tracking tags, which enhances the ability to manage resources and monitor status of resources over a wider geographic area.

The present invention supports the use of telematics in network edge RFID devices for fixed and mobile tracking (inventory, movable assets, people, and any other RFID tagable items) using LTE, WiFi SAT or any other wireless communication protocols, and provides a mobile connectivity platform for real-time tracking of remote assets and inventory, in mobile or field-based environments including onboard wireless synchronization between mobile inventory and asset tracking. The present invention also includes a communication network interface supporting communications between a vehicle/equipment, the cloud, and other system components, including interface with RFID tagged devices over passive, active, Bluetooth, WiFi, near field, cellular and satellite communication protocols.

The present invention supports field-based asset and inventory accounting network and services supporting location, telematics, sensors, asset and inventory data collection and processing, and the present invention supports the transmission of data into a proprietary cloud based Asset Management software, supporting asset and inventory accounting network and services supporting location, telematics, asset and inventory data collection and processing, including software used on tablet or smartphone including iOS®, Android®, Blackberry or Windows Phone® mobile platforms.

The controller in the present invention is located in the mobile vehicle network, and this controller provides an all-in-one integrated command and communication platform, with the controller supporting connectivity to the home network through various communication platforms. The present invention includes an integrated support platform for communications between cell phone, WiFi, GPS, RFID controllers, NFC, BLE, Ethernet, vehicle information controller (OBD2/CANBUS), and smartpower management. Moreover, the present invention supports real-time integration of data to the enterprise application software located on the home network. The present invention is easily accessible by customers so they can access advanced mobile Inventory and asset tracking solutions across a fleet or around the world.

The following system components, steps and functionality individually are believed to be novel and enhance the operation of the communication system over that of a generic computer system, including the components, steps and functionality relating to: (1) integrated GPS for asset tracking and monitoring; (2) integrated 4G Data Phone for Data Exchange; (3) integrated RFID Reader that supports up to 16 external antennas; (4) integrated RFID reader capable of transmitting at up to 31.5 dbm; (5) integrated 802.11 b/g/n WiFi/Bluetooth transceiver; (6) integrated USB Host 2.0; (7) CAN interfaces for high speed and single wire systems; (8) external connect to NFC Reader; (9) integrated Ethernet connector; (10) integrated WiFi tag reader; (11) integrated NFC reader; (12) integrated BLE reader; (13) smartpower management to identify low battery power and transition to sleep mode to avoid battery drain; (14) real-time integration to enterprise software and the Cloud; (15) ability to detect active antennas and configure system to optimize reading each of the technologies (RFID, WiFi, NFC, BLE); (16) ability to detect the highest performance and lowest cost transmission to connect to the cloud minimizing data transmission costs; (17) CPU Dual Core 800 MHz processor; and, (18) remote diagnostic and firmware update capabilities. The system components, steps and functionality described herein, individually and collectively, are believed to be novel and enhance the operation of the communication system over the prior art technology.

DETAILED DESCRIPTION OF THE PREFERRED EMBODIMENTS

The present invention supports field-based asset and inventory accounting network and services supporting location, telematics, sensors, asset and inventory data collection and processing, and the present invention supports the transmission of data into a proprietary cloud based Asset Management software, supporting asset and inventory accounting network and services supporting location, telematics, asset and inventory data collection and processing, including software used on tablet or smartphone including iOS®, Android®, Blackberry or Windows Phone® mobile platforms.

The present invention supports the use of telematics in network edge RFID devices for fixed and mobile tracking (inventory, movable assets, people, and any other RFID tagable items) using LTE, WiFi SAT or any other wireless communication protocols, and provides a mobile connectivity platform for real-time tracking of remote assets and inventory, in mobile or field-based environments including onboard wireless synchronization between mobile inventory and asset tracking. The present invention also includes a communication network interface supporting communications between a vehicle/equipment, the cloud, and other system components, including interface with RFID tagged devices over passive, active, Bluetooth, WiFi, near field, cellular and satellite communication protocols.

The present invention is machine-to-machine (M2M) mobile platform that has a controller that can communicate with RFID tags and receives RFID information into a mobile vehicle foreign network with an all-in-one mobile solution and also communicates with a home network having a computer server. The present invention provides an integrated command and communication platform to support communications by cell phone, WiFi, GPS, RFID controller, vehicle information controller, and real-time integration to optimize performance of the remote tracking network. With the use of the present invention, fleet services, mobile inventory, and asset tracking can be efficiently organized and conducted across a fleet vehicles, a multitude of remote tracking devices, and geographically around the world.

With the invention, the RFID data transmitted to and through the mobile vehicle network has greater throughput and less interference compared to transmissions from RFID transponders to prior interrogator units, which increases the spatial area available for RFID coverage and permits a larger number of RFID transponders to be used on the system, among various other advantages. The present invention is a system and method the supports improved the tracking of an increased number of RFID tracking tags, which enhances the ability to manage resources and monitor status of resources over a wider geographic area.

FIG. 1 shows the framework 100 of modules and engines supported by the controller in the present invention, which include the following: (1) data collection engine 101; (2) data communication engine 103; (3) smartpower engine 105; (4) RFID reader and multiplexer module; (5) geolocation and tracking engine; (6) CAN-BUS interface engine; (7) vehicle bus (OBD) engine; (8) device management engine 115; and (9) operations engine 117. Each of these framework 100 modules and engines will be addressed in more detail in FIGS. 2-10, but generally, the (1) data collection engine 101 controls and supports the scanning operations and collection of data by and through the controller unit; (2) data communication engine 103 controls and supports the communication and data transmission operations by and through the controller unit; (3) smartpower engine 105 manages power consumption of the controller unit, identifies low battery power status, and transitions the controller unit to sleep mode to avoid battery drain; (4) RFID reader and multiplexer module receives and manages the communications with multiple RFID signals using a multiplexed antenna configuration; (5) geolocation and tracking engine 109 controls and supports the geolocation, tracking, and status of the controller unit, RFID tags, and managed assets associated with RFID tags; (6) CAN-BUS interface engine supports two way communications between the controller unit and external devices; (7) vehicle bus (OBD) engine manages all interactions between the controller unit and the vehicle; (8) controller device management engine 115 supports and manages all operational support components associated with the controller unit; and, (9) operations engine 117 supports and manages all component service engines and modules in the controller unit framework 100.

Figure 11:
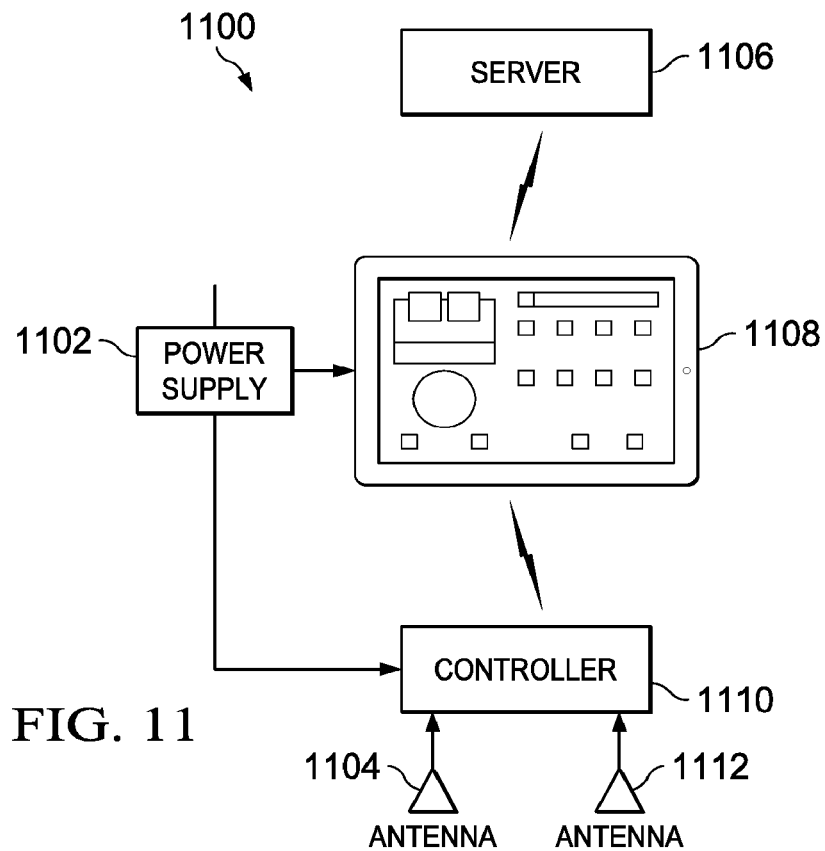
FIG. 11-14 show component block diagrams for several configurations of the present invention.

The controller unit is shown in FIGS. 11 (1110), 12 (1212), 13 (1312); 14 (1412) and 15(1510), and the controller unit processes and supports the controller unit framework 100 of modules and engines. The architecture of the framework 100 in the present invention seamlessly supports changes in evolving communication standards, such as constantly evolving RFID standards and other innovations, and the system includes vehicle-mounted components that are coupled a bulkhead wall of a vehicle or elsewhere where there are connections to the vehicle power. The mobile vehicle network can select one of multiple external access points and communication channels, such as a cellular system or the Internet, to perform data transfer to the host computer network, and a communication protocol (such as Bluetooth) may allow pairing to mobile devices (e.g., tablet, etc.) for monitoring or control of the remote vehicle network and the RFID tags coupled to that mobile vehicle network. In the present invention, the mobile vehicle network can also be place on a stationary foreign network support platform.

The controller unit framework 100 supports the following system components, steps and functionality, which are individually and collectively believed to be novel and enhance the operation of the communication system over that of a generic computer system, including the components, steps and functionality relating to: (1) integrated GPS for asset tracking and monitoring; (2) integrated 4G Data Phone for Data Exchange; (3) integrated RFID Reader that supports up to 16 external antennas; (4) integrated RFID reader capable of transmitting at up to 31.5 dbm; (5) integrated 802.11 b/g/n WiFi/Bluetooth transceiver; (6) integrated USB Host 2.0; (7) CAN interfaces for high speed and single wire systems; (8) external connect to NFC Reader; (9) integrated Ethernet connector; (10) integrated WiFi tag reader; (11) integrated NFC reader; (12) integrated BLE reader; (13) smartpower management to identify low battery power and transition to sleep mode to avoid battery drain; (14) real-time integration to enterprise software and the Cloud; (15) ability to detect active antennas and configure system to optimize reading each of the technologies (RFID, WiFi, NFC, BLE); (16) ability to detect the highest performance and lowest cost transmission to connect to the cloud minimizing data transmission costs; (17) CPU Dual Core 800 MHz processor; and, (18) remote diagnostic and firmware update capabilities.

The controller unit (shown in FIGS. 11 (1110), 12 (1212), 13 (1312); 14 (1412) and 15(1510)) in the present invention and its framework 100 provides a robust set of services (engines) that enable advanced command and communication capabilities that include cell, WiFi, NFC, BLE, RFID, GPS, Vehicle OBD, CAN-BUS. The controller unit also provides real-time access to the asset management and inventory software system, which can be a Cloud based and supported by the server computer on the home network. The server (shown in FIGS. 11 (1106), 12 (1206), 13 (1306); 14 (1406) and 15(1510)) in the present invention is on the home network operates enterprise asset management and tracking software, which supports the following: (1) Alerts (such as entry into a defined location, exit from a define location, alert when temperature is above or below a threshold, automated maintenance schedule based on sensor or data event(s)), (2) Tracking (such as history of tracking for a tag (asset), last know location, counts of assets at location); and, (3) Device Management (tracking of activation through disposal, management of software version and control of all upgrades from cloud, cell firmware update, Ability to configure read frequency, read duration, transmission technology (cell, WiFi, Bluetooth, Satellite), transmission frequency); and, (4) Asset Management (including tracking of asset from acquisition to disposal, maintenance notifications based on sensor data, maintain device assignment by asset, ability to configure asset as a container of assets for tracking purposes, maintain location history of asset being tracked, and maintain custodial assignment of asset being tracked).

The system components, steps and functionality described herein, individually and collectively, are believed to be novel and enhance the operation of the communication system over the prior art technology. The controller unit (shown in FIGS. 11 (1110), 12 (1212), 13 (1312); 14 (1412) and 15(1510)) in the present invention is located in the mobile vehicle network, and this controller unit provides an all-in-one integrated command and communication platform, with the controller supporting connectivity to the home network through various communication platforms. The present invention includes an integrated support platform for communications between cell phone, WiFi, GPS, RFID controllers, NFC, BLE, Ethernet, vehicle information controller (OBD2/CANBUS), and smartpower management. Moreover, the present invention supports real-time integration of data to the enterprise application software located on the home network. The present invention is easily accessible by customers so they can access advanced mobile Inventory and asset tracking solutions across a fleet or around the world.

The controller unit (shown in FIGS. 11 (1110), 12 (1212), 13 (1312); 14 (1412) and 15(1510)) in the present invention is preferably supported by a CPU having a dual core 800 MHz processor (quad Core optional), memory of PRAM 512 KB, a microSD card reader with 4 GB support minimum, USB Host 2.0, WiFi 802.11 b/g/n with Bluetooth, power supply 12V/24V. The controller unit (shown in FIGS. 11 (1110), 12 (1212), 13 (1312); 14 (1412) and 15(1510)) in the present invention receives and processes sensor data including speed, acceleration/impact, location, direction, door open/close, automotive status (fuel levels, maintenance needs), automotive sensors (vehicle proximity), optical (infra-red, flame, photodetector, visible light, etc.), thermal (Temperature), chemical (carbon, hydrogen, oxygen, smoke, etc.), environmental (rain, snow, soil moisture, gas detector, dew, air pollution), and proximity (motion, proximity, touch, etc.). The hardware options for the controller unit (shown in FIGS. 11 (1110), 12 (1212), 13 (1312); 14 (1412) and 15(1510)) in the present invention includes: CAN BUS, wired network (upstream or downstream), wireless network (as a hotspot or client), USB, PoE, cellular, Bluetooth (BLE tags or other devices), NFC, camera (photo/video), environmental control hub, and Light/Display controls. The functionality operations supported by the controller unit include low power mode, self-diagnosis of failures, health reports (of self or as a relay), network QoS and/or throttling, event driven tag reads (door open/close, vehicle stop/start, etc.), efficient data transmission (compressions, deltas only), and modular additional of features (e.g. one master controller, modular RF modules at a cheaper cost).

Figure 2:
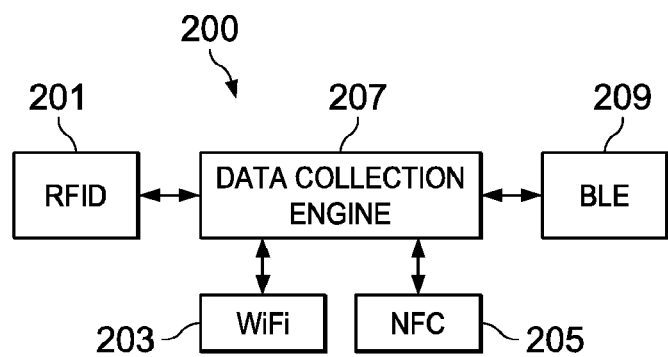

FIGS. 2-10 show the functionality of each module and engine in the framework 100. FIG. 2 shows the data collection engine 200 (101 in FIG. 1), which controls and supports the scanning operations and collection of data by and through the controller unit. The data collection engine module 207 manages all scanning operations and data collection activities for the device and is coupled to RFID 201, WiFi 203, NFC 205 and BLE 209 protocol modules and engines. The data collection engine 200 identifies all available tag options in the environment (RFID, WiFi, NFC, BLE), utilizes system preferences to schedule scanning operations, and initiates scanning operations and manage data collection from each environment. On startup, data collection engine 200 identifies all available reader options and using administrative preferences schedules optimal data collection activities for the device, and it manages all data collection and storage operations through successful transmission through the cloud by the communications engine.

Figure 3:
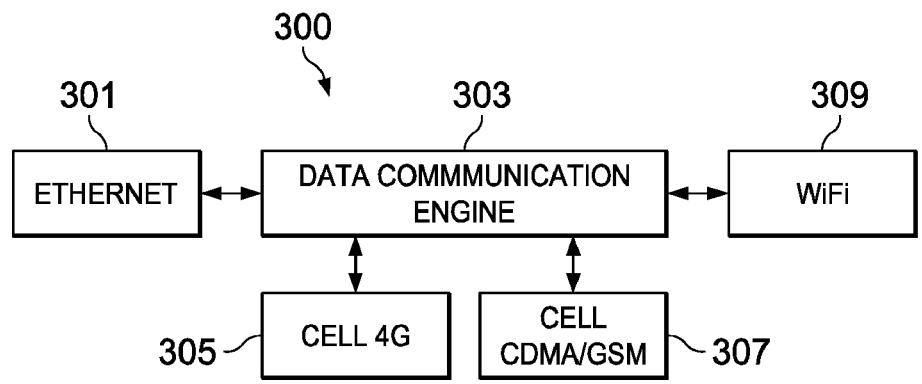

FIG. 3 shows the data communication engine 300 (103 in FIG. 1), which controls and supports the communication and data transmission operations by and through the controller unit. The data communication engine 300 identifies all available communication option, preferred network based on performance and cost parameters, and establishes and utilizes the optimized communicationchoice. The data communication engine module 303 manages all communication and data transmission operations for the device and supports and is coupled to the Ethernet 301, cellular 4G 305, cellular CDMA/GSM 307, and WiFi 309 modules and engines. On startup, the data communication engine 300 identifies all available communication options; and, using administrative preferences and optimization algorithms, manages data communication activities for the device. The data communication engine 300 manages the following communication options Cell 4G, Cell CDMA/GSM, Ethernet, WiFi with the WiFi also being configured to be a hotspot for other mobile devices in the proximity.

Figure 4:
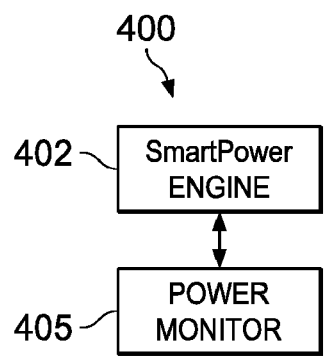

FIG. 4 shows the smartpower engine 400 (105 in FIG. 1), which manages power consumption of the controller unit, identifies low battery power status, and transitions the controller unit to sleep mode to avoid battery drain. The smartpower engine module 402 monitors inbound power level using the monitor module 405 connected thereto, coordinates a safe shut-down if power drops below setlevel, and insures the controller unit operates in a safe power level. On startup, the smartpower engine 400 identifies the current status of the device and based on power strength and administrative preferences manages power awareness for the controller's operations engine (117 in FIG. 1). Should a drop in power occur, the smartpower engine 400 initiates the safe shut-down of the device and ensures that all data is either transmitted or secured for transmission once an acceptable power status is obtained.

Figure 5:
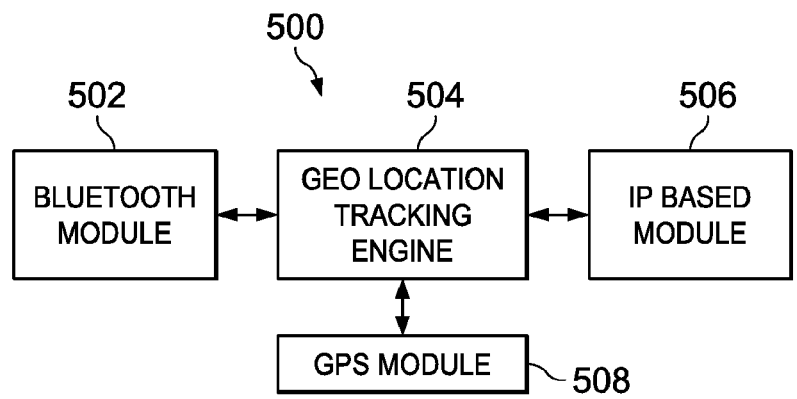

FIG. 5 shows the geolocation and tracking engine 500 (109 in FIG. 1), which controls and supports the geolocation, tracking, and status of the controller unit, RFID tags, and managed assets associated with RFID tags. The geolocation and tracking engine module 504 is coupled to the Bluetooth module 502, the GPS module 508, and the IP Based module 506, and the geolocation and tracking engine 500 manages all locating activities for the device by and through these modules, establishes GPS connection and manages operational status, and provides GPS information needed to support controller functions.

On startup, the geolocation and tracking engine 500 identifies the locating options available on the device and initiates utilization of the module that will provides the highest locating fidelity for the environment (GPS for outside (or inside with appropriate hardware), and Bluetooth and IP based locating for non-GPS areas that are equipped with Bluetooth or IP based communication options). The geolocation and tracking engine 500 manages all location based data for use by the data collection engine (101 in FIG. 1), and supports all related boundary alerts that are sent back to the server on the home network.

Figure 6:
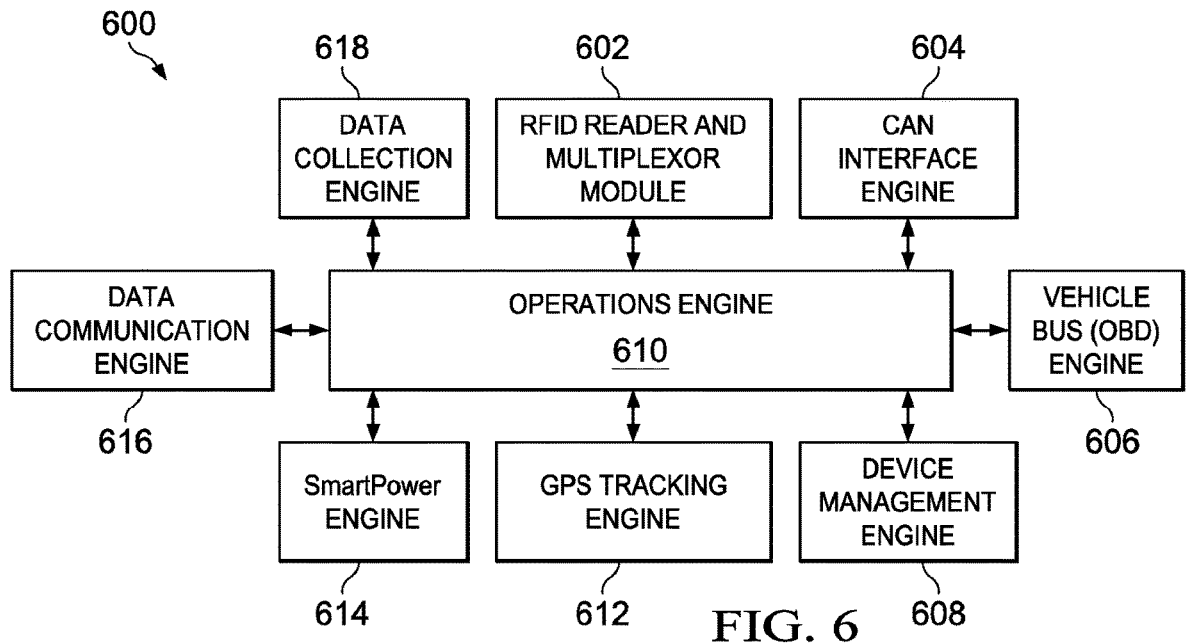

FIG. 6 shows the operations engine 600 (117 in FIG. 1), which supports and manages all component service engines and modules in the controller unit framework 100. The operations engine 600 controls and coordinate controller unit coupled components and manages all component service engines within the controller unit framework 100. The operations engine module 610 is coupled to the other modules in the controller unit framework, including the RFID Reader module 602, data collection engine 618, data communication engine 616, smartpower engine 614, geolocation and tracking engine 612, device management engine 608, vehicle bus engine 606, and the CAN interface engine 604. At startup, the operations engine 600 assesses the status of all sub-component engines and using administrative operational preferences initiates the resumption or start of data collection and transmission activities for the controller unit. The operations engine 600 manages and ensures all sub-component engines are operational and function at expected performance levels.

Figure 7:
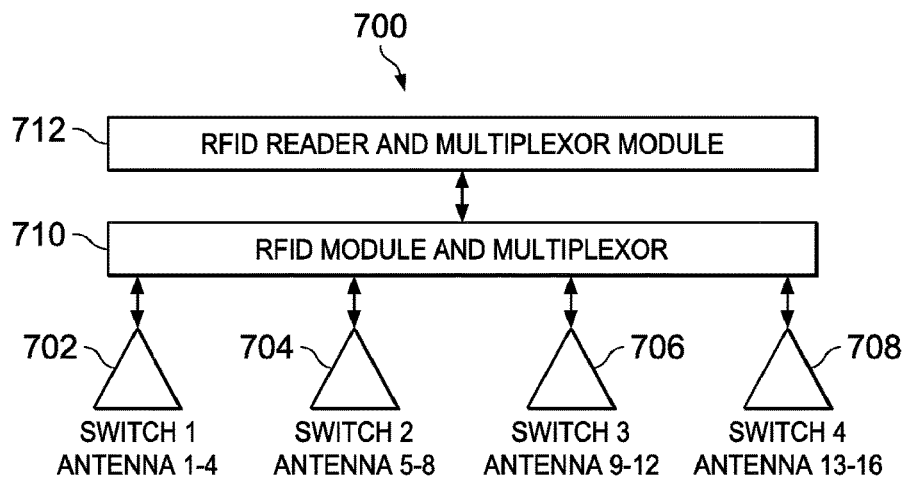

FIG. 7 shows the RFID reader and multiplexer module 700 (107 in FIG. 1), which receives and manages the communications with multiple RFID signals using a multiplexed antenna configuration. The RFID reader and multiplexor module 712 is coupled to the RFID module and multiplexor 710, which is coupled to switch 1 702, switch 2, 704, switch 3 706, and switch 4 708 where each switch maintains and supports transmission and communications to four antenna, each of which receives data from different RFID tags in the read vicinity. The RFID reader and multiplexer module 700 manages all RFID scanning operations and data collection activities for the controller unit and it uses administrative preferences to schedule optimal data collection activities for up to 16 antennas on the device. The RFID reader and multiplexer module 700 manages all data and storage functions in a manner that optimizes the storage and transmission functions of the device, and it collects RSSI (signal strength) used to resolve any multi-reader scanning of RFID tags in the read vicinity. Specifically, the RFID reader and multiplexer module 700 establishes and manages connection to RFID Reader Module, administrates and configures antenna(s) for operational use, manages data interrogation and collection activities, and manages data preparation and conditioning activities.

Figure 8:
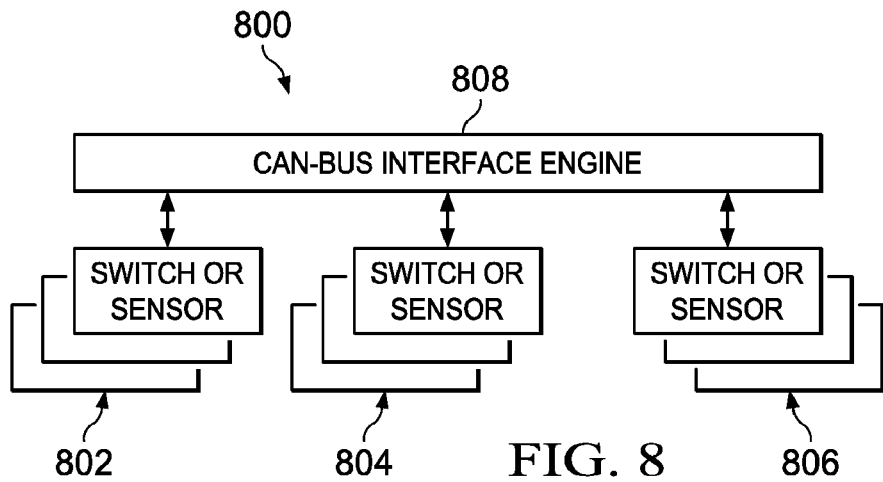

FIG. 8 shows the CAN-BUS interface engine 800 (111 in FIG. 1), which supports two-way communications between the controller unit and external devices, manages all CAN-BUS interface activities for the device, administrates and configures CAN Interface(s) operational use, manages data interrogation and response activities, manages data preparation and conditioning activities, administrates and configures CAN Interface(s) operational use, manages data interrogation and response activities, manages data preparation and conditioning activities. As shown in FIG. 8, the CAN-BUS interface engine module 808 is coupled to switch/sensor 802, 804 and 806. Based on configuration and administrative preferences and working in conjunction with the other engines in the controller unit, the CAN-BUS interface engine 800 can support a large range of external devices such as sensors, lights, audio, video, and temperature. The CAN-BUS interface engine 800 can provide two way interaction with these external devices which allows collection as well as management of/from/to these devices.

Figure 9:
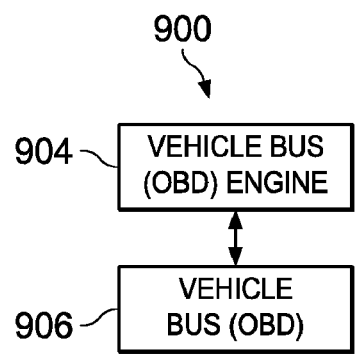

FIG. 9 shows the vehicle bus (OBD) engine 900 (113 in FIG. 1), which manages all interactions between the controller unit and the vehicle, establishes OBD connection and manages operational status, provides power (optional) and OBD information available from the vehicle information bus. The vehicle bus (OBD) engine module 904 is coupled to the vehicle bus (OBD) 906, and the vehicle bus (OBD) engine 900 manages all interaction with the vehicle Onboard diagnostics (OBD) using the OBD II interface. The vehicle bus (OBD) engine 900 receives all related vehicle information (e.g., speed, direction, alerts, idle time, etc.); and, based on administrative preferences and rules, the vehicle bus (OBD) engine 900 collects and submits appropriate vehicle based data to be transmitted to the home network. The vehicle bus (OBD) engine 900 also supports the transmission of data to the smartpower engine (105 in FIG. 1) in addition to be a power source for the controller unit.

Figure 10:
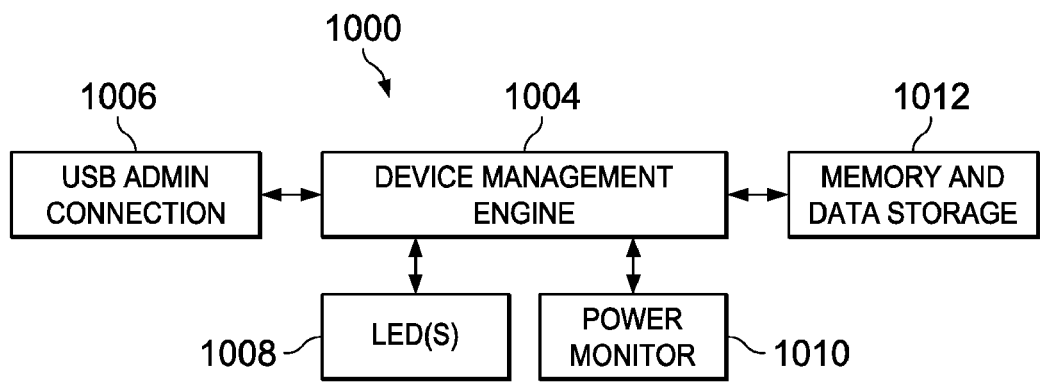

FIG. 10 shows the controller device management engine 1000 (115 in FIG. 1), which supports and manages all operational support components associated with the controller unit, manages administrative and operational components of the controller unit, manages memory and storage activities, and manages administrative functions (e.g., firmware updates, configurations, etc.). The controller device management engine module 1004 is coupled to the USB administration connection 1006, the LEDs 1008, power monitor 1010, memory and data storage 1012, and the controller device management engine 1000 manages all operational support components associated with the controller unit. Devices such as on-board battery and power monitor, LED(s), memory and data storage, USB connections as well as optional devices are managed by this engine, and the controller device management engine 1000 ensures operational performance of the device and manages all administrative preferences and related functions.

The controller unit (shown in FIGS. 11 (1110), 12 (1212), 13 (1312); 14 (1412) and 15(1510)) in the present invention may be vehicle-mounted on engine compartment bulkhead or beneath the vehicle dashboard with connection to power from either a power management module connecting direct to the vehicle or through the OBD2 connector. The controller unit (shown in FIGS. 11 (1110), 12 (1212), 13 (1312); 14 (1412) and 15(1510)) in the present invention will, based on customer settings, select an external access point through the integrated 802.11 b/g/n WiFi or over the cellular system via Internet to effectively manage the cost of data transfer. A Bluetooth connection may also be made available for pairing to mobile devices (e.g., tablet, etc.) for monitoring or controlling the controller unit. The controller unit (shown in FIGS. 11 (1110), 12 (1212), 13 (1312); 14 (1412) and 15(1510)) in the present invention is housed in an extruded aluminum box to ensure durability for the device in a real world work environment, and the controller unit is coupled to the power source of the vehicle and additional antennas are placed in the vehicle to receive RFID tag signals. The placement of the controller unit physical components can be seen in FIG. 14B, where board 1450 has a board substrate 1478, pin-out communication pins 1490, pins 1485, pins 1475; and controller chip 1480.

Figure 12:
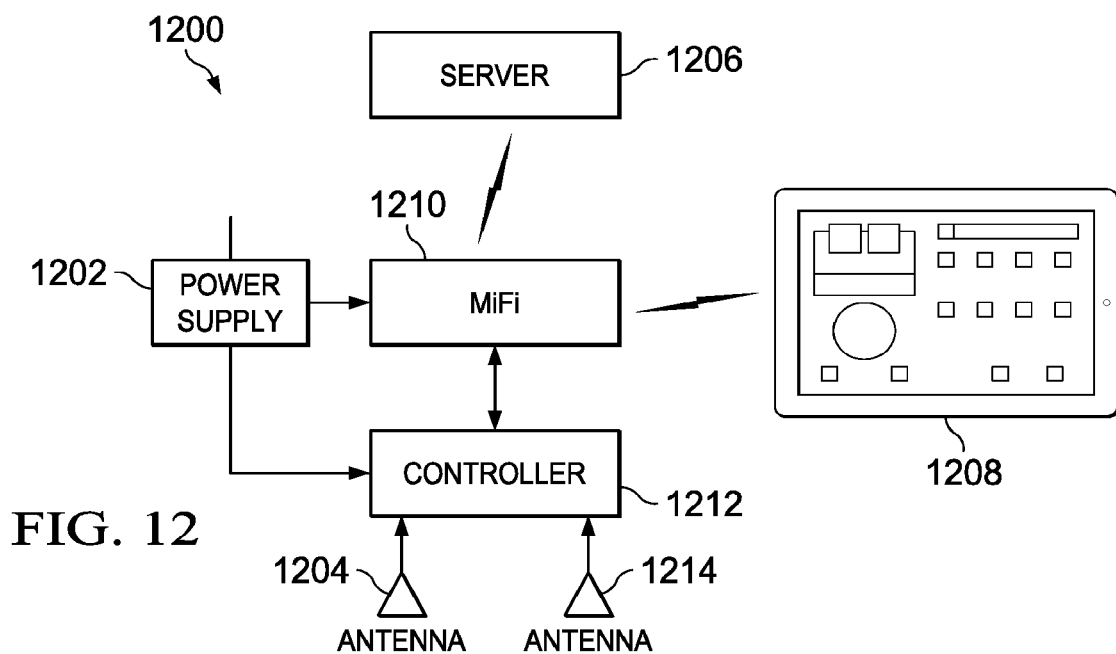

FIGS. 11-14 show a block diagram of the communication system, which includes the computer server, laptops, controller unit, and antennas. In FIG. 11 for system configuration 1100, the antennas 1104 and 1112 are coupled to the controller unit 1110, which is coupled to a pad/laptop computer 1108. The controller unit 1110 and pad/laptop computer 1108 are coupled to power supply 1102, and the pad/laptop interfaces with the computer server 1106. In FIG. 12 for system configuration 1200, the antennas 1204 and 1214 are coupled to the controller unit 1212, which is coupled to MiFi communication hub 1210. The MiFi communication hub 1210 and controller unit 1212 are coupled to power supply 1202, and the MiFi communication hub 1210 is coupled to the pad/laptop 1208 and separately to the computer server 1206.

Figure 13:
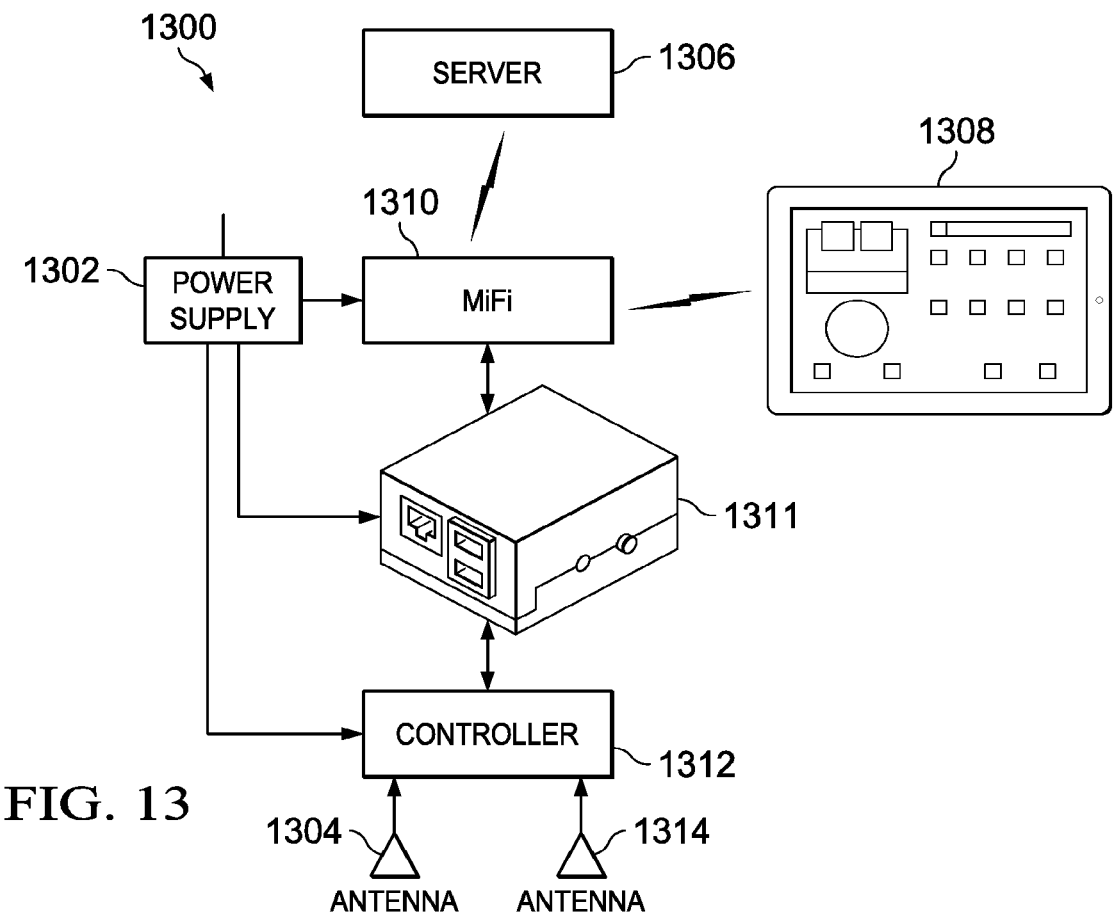
Figure 14:
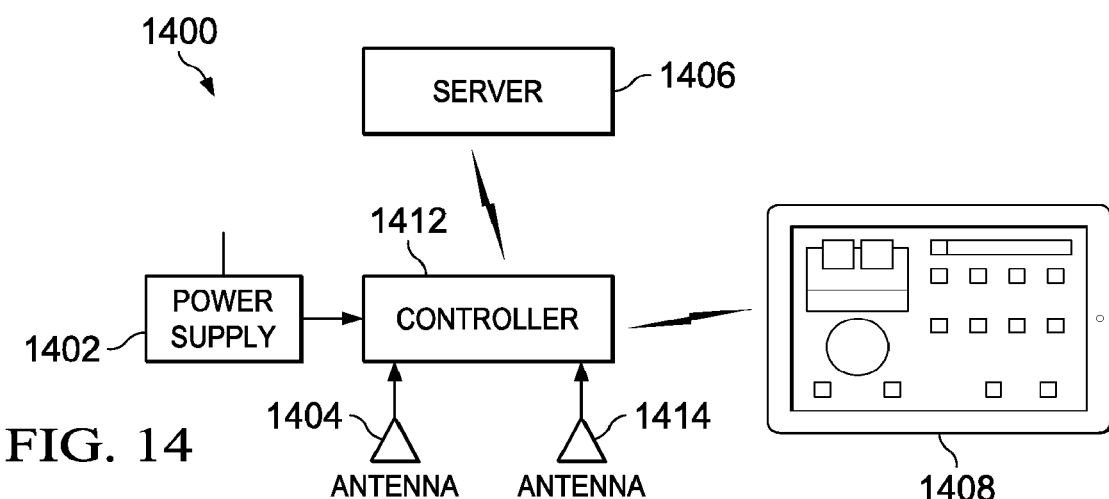
Figure 14B:
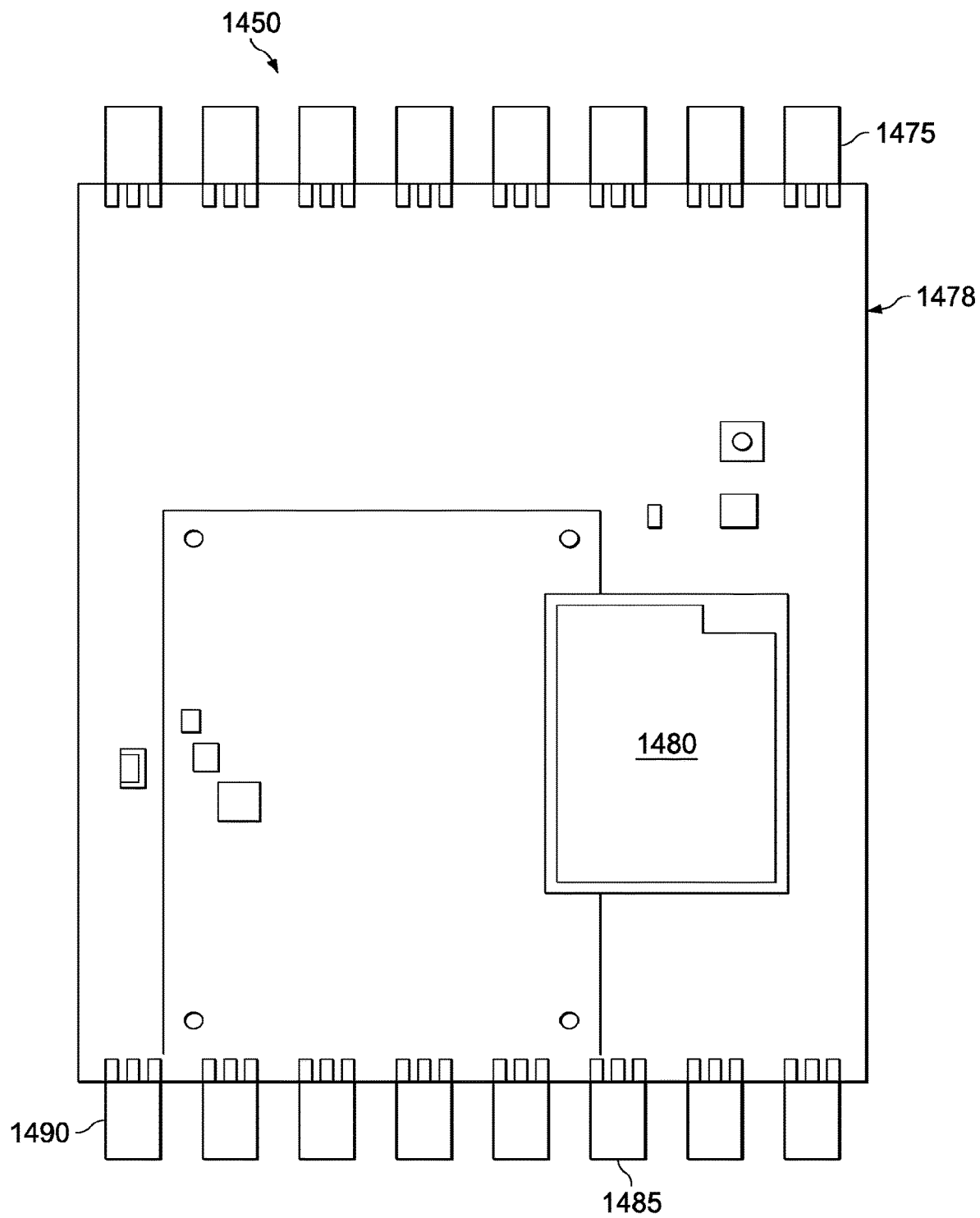
FIG. 14B shows a printed circuit board for the controller unit in the present invention; and, FIG. 15 shows a communications network according to the present invention.

In FIG. 13 for system configuration 1300, the antennas 1304 and 1314 are coupled to the controller unit 1312, which is coupled to a server computer 1311 that is separately coupled to a MiFi communication hub 1310. The MiFi communication hub 1310, a first computer server 1311 and controller unit 1312 are coupled to power supply 1302, and the MiFi communication hub 1310 is coupled to the pad/laptop 1308 and separately to the home network second computer server 1306. In FIG. 14 for system configuration 1400, the antennas 1404 and 1414 are coupled to the controller unit 1412. The controller unit 1412 is coupled to power supply 1402, and the controller unit 1412 is coupled to the pad/laptop 1408 and separately to the computer server 1406.

Figure 15:
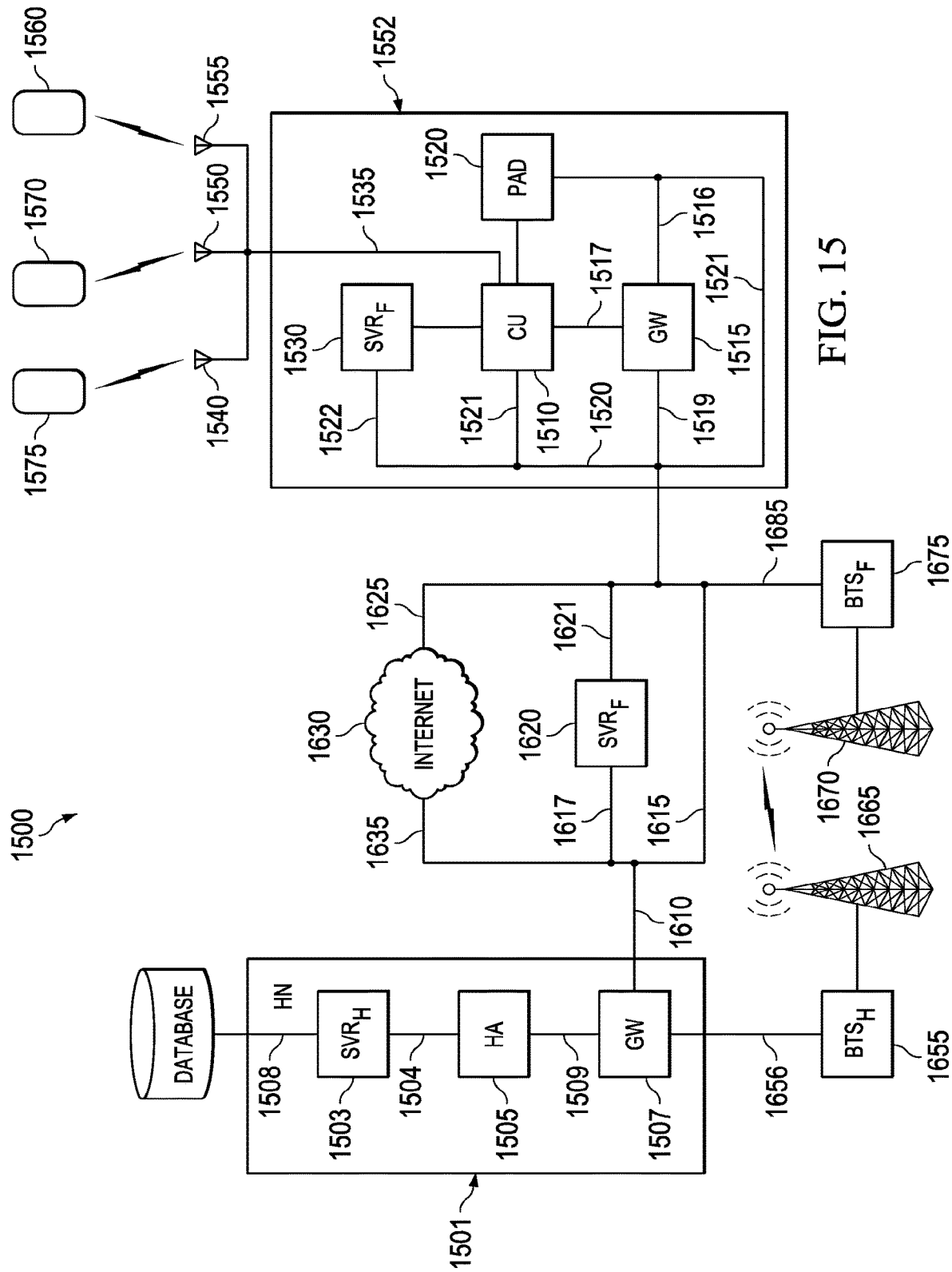

The present invention is shown by the block diagram in FIG. 15, and is a communication system supporting the processing communications between a home network 1501 and one or more mobile foreign networks 1552, where the home network 1501 has a home agent 1505 coupled to a computer server(h) 1503 by line 1504. The computer server (h) 1503 is coupled to a database memory 1625. While only one database 1625 is shown, this representation is understood to include one or more separate databases and storage locations of data and information. A communications link or line is any connection between two or more nodes on a network or users on networks or administrative domains, including serial lines, parallel lines and bus lines for electronic signal transmission.

The database 1625 may maintain information related asset management and tracking, and the home network server computer(h) 1503 processes instructions and data to operate the enterprise asset management and tracking software for the system. The invention contemplates centrally located computer servers to operate the software modules and database information on the network, but remotely located servers and computer networks can also be accessed and used with the invention.

The home agent 1505 on the home network 1501 is coupled to a gateway 1507 by line 1504, and the gateway 1507 facilitates communicates to and from the home network 1501. The gateway 1507 is coupled to a basestation transceiver BTSh 1655 via line 1656, which is coupled to a radio transmission unit and antenna 1665 via line 1667. That radio transmission unit and antenna 1665 facilitates communications to other radio transmission units 1670. The transmission unit 1665 supports radio transmission communications links (e.g. Wi-Fi, cellular, GSM, Evdo, 4G/LTE, CDMA, or others), to other networks and communication units.

The gateway 1507 is also coupled via line 1610 to hardwire communication line 1615, computer server(c) 1620 via line 1617, and the Internet 1630 via line 1635. The home network processes communications to and from said mobile foreign network, and information related to the external devices and radio tags (e.g. location, proximity, status) can be included in communications to the home network. The home network can communicate via wireless transmission or a wired communication link to the mobile node, the Internet, other computer servers or other foreign or associated home networks.

As also shown in FIG. 15, radio transmission RFID tags 1575, 1570 and 1560 are electronically coupled to RFID readers 1540, 1550 and 1555, respectively. RFID readers 1540, 1550 and 1555 are coupled to the controller unit CU 1510 via line 1535, which is coupled to computer server(f) 1530 via line 1523, pad/laptop 1520 via line 1524, and foreign network gateway 1515 via line 1517.

The controller unit CU 1510, computer server(f) 1530, pad/laptop 1520, and foreign network gateway 1515 are coupled to the Internet 1630 via lines 1625 and 1521, lines 1625 and 1522, lines 1625 and 1519, and lines 1625 and 1521 respectively. The controller unit CU 1510, computer server(f) 1530, pad/laptop 1520, and foreign network gateway 1515 are coupled to the computer server(c) 1620 via lines 1621 and 1521, lines 1621 and 1522, lines 1621 and 1519, and lines 1621 and 1521 respectively. The controller unit CU 1510, computer server(f) 1530, pad/laptop 1520, and foreign network gateway 1515 are coupled to the home network 1501 by a hardwire communication link via lines 1610, 1615, and 1521; lines 1610, 1615, and 1522; lines 1610, 1615, and 1519; and lines 1610, 1615, and 1521, respectively. And, controller unit CU 1510, computer server (f) 1530, pad/laptop 1520, and foreign network gateway 1515 are coupled to the basestation transceiver unit (coupled to transmission unit and antenna 1670) via lines 1685 and 1521, lines 1685 and 1522, lines 1685 and 1519, and lines 1685 and 1521 respectively.

The above-described embodiments of the present application are intended to be examples only. Those of skill in the art may effect alterations, modifications and variations to the particular embodiments without departing from the scope of the application. In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

We claim:

1. A communication system supporting processing of communications regarding tracking, location and status of field assets, comprising:
 a first computer server on a home network, said first computer server having processors with functionality to receive and process tracking, location and status information signals relating to field assets, said first computer server coupled to a first database for storing and maintaining information relating to said field assets and said first computer server being coupled to a home agent and a first gateway server for communication outside the home network;
 a second computer server on a foreign network, said second computer server being coupled to a controller unit, said controller unit being coupled to a second gateway server for communication outside the foreign network and said controller unit being coupled to one or more antennas that receive radio transmitted signals from radio frequency identification (RFID) tags, each of said RFID tags being associated with a field asset and said controller unit using said radio transmitted signals received by the antennas to produce tracking, location and status information signals that are communicated to the first computer server on the home network, said controller unit having functional capabilities that include a data collection engine that controls and supports scanning operations and collection of data by and through the controller unit, a data communication engine that controls and supports communication and data transmission operations by and through the controller unit; a smartpower engine that manages power consumption of the controller unit, identifies low battery power status, and transitions the controller unit to sleep mode to avoid battery drain, an RFID reader and multiplexer module that receives and manages the communications with multiple RFID signals using a multiplexed antenna configuration, a geolocation and tracking engine that controls and supports geolocation, tracking, and status of the controller unit, RFID tags, and field assets associated with RFID tags, a controller area network bus (CAN-BUS) interface engine that supports two way communications between the controller unit and external devices, an onboard diagnostics (OBD) engine manages all interactions between the controller unit a vehicle; a controller device management engine that supports and manages all operational support components associated with the controller unit; and, an operations engine that supports and manages all component service engines and modules in the controller unit.

2. The communication system according to claim 1 further comprising:
a communication link between the home and foreign network supported over the Internet.

3. The communication system according to claim 1 further comprising:
a communication link between the home and foreign network supported over a radio communication systems.

4. The communication system according to claim 1 further comprising:
a communication link between the home and foreign network supported over a computer network.

5. The communication system according to claim 1 further comprising:
a computer pad located on the foreign network and coupled to the controller unit, said computer pad controlling the controller unit and other equipment coupled to the foreign network.

6. The communication system according to claim 1 further wherein said foreign network is a mobile foreign network that is mobile relative to the location of the home network.

7. The communication system according to claim 1 further comprising:
one or more data entry terminals located on said home network for access to the first computer server, home agent or database memory storage unit on the home network.

8. The communication system according to claim 1 further comprising:
one or more data entry terminals located on said foreign network for access to the second computer server or controller unit on the foreign network.

9. The communication system according to claim 1 further comprising:
a transceiver coupled to said home network through said first gateway providing a communications interface for communications to and from the home network.

10. The communication system according to claim 1 further comprising:
a transceiver coupled to said foreign network through said second gateway providing a communications interface for communications to and from the foreign network.

11. A communication system supporting processing of communications regarding tracking, location and status of field assets, comprising:
a first computer server on a home network, said first computer server having processors with functionality to receive and process tracking, location and status information signals relating to field assets, said first computer server coupled to a first database for storing and maintaining information relating to said field assets and said first computer server being coupled to a home agent and a first gateway server for communication outside the home network;
a second computer server on a foreign network, said second computer server being coupled to a controller unit, said controller unit being coupled to a second gateway server for communication outside the foreign network and said controller unit being coupled to one or more antennas that receive radio transmitted signals from radio frequency identification (RFID) tags, each of said RFID tags being associated with a field asset and said controller unit using said radio transmitted signals received by the antennas to produce tracking, location and status information signals that are communicated to the first computer server on the home network,
said controller unit having functional capabilities that include a data collection engine that controls and supports scanning operations and collection of data by and through the controller unit, a data communication engine that controls and supports communication and data transmission operations by and through the controller unit;
an RFID reader and multiplexer module that receives and manages the communications with multiple RFID signals using a multiplexed antenna configuration, and a geolocation and tracking engine that controls and supports geolocation, tracking, and status of the controller unit, RFID tags, and field assets associated with RFID tags.

12. The communication system according to claim 11 further comprising:
said controller unit having a smartpower engine that manages power consumption of the controller unit, identifies low battery power status, and transitions the controller unit to sleep mode to avoid battery drain; an onboard diagnostics (OBD) engine manages all interactions between the controller unit and a vehicle; a controller device management engine that supports and manages all operational support components associated with the controller unit; and, an operations engine that supports and manages all component service engines and modules in the controller unit.

13. The communication system according to claim 11 further comprising:

a controller area network bus (CAN-BUS) interface engine that supports two way communications between the controller unit and external devices, said two way communications being capable of remotely controlling and monitoring operations of a remotely located asset or location.

14. The communication system according to claim 11 further comprising:
a communication link between the home and foreign network supported over the Internet.

15. The communication system according to claim 11 further comprising:
a communication link between the home and foreign network supported over a radio communication systems.

16. The communication system according to claim 11 further comprising:
a communication link between the home and foreign network supported over a computer network.

17. The communication system according to claim 11 further comprising:
a computer pad located on the foreign network and coupled to the controller unit, said computer pad controlling the controller unit and other equipment coupled to the foreign network.

18. The communication system according to claim 11 further wherein said foreign network is a mobile foreign network that is mobile relative to the location of the home network.

19. The communication system according to claim 11 further comprising:
one or more data entry terminals located on said home network for access to the first computer server, home agent or database memory storage unit on the home network.

20. The communication system according to claim 11 further comprising:
one or more data entry terminals located on said foreign network for access to the second computer server or controller unit on the foreign network.

21. The communication system according to claim 11 further comprising:
a transceiver coupled to said home network through said first gateway providing a communications interface for communications to and from the home network.

22. The communication system according to claim 11 further comprising:
a transceiver coupled to said foreign network through said second gateway providing a communications interface for communications to and from the foreign network.

23. A method of transmitting communications regarding tracking, location and status of field assets, comprising the steps of:
providing a first computer server on a home network, said first computer server coupled to a first database and a first gateway, said first computer server having processors;
supporting communications to and from the home network using said first gateway server;
providing a second computer server on a foreign network, said second computer server being coupled to a controller unit and a second gateway server, said second gateway server being used to support communication outside the foreign network;
coupling one or more antennas to said controller unit, said one or more antennas being capable of receiving radio transmitted signals from radio frequency identification (RFID) tags;
receiving radio transmitted signals from RFID tags at said one or more antennas, each of said RFID tags being associated with a field asset, said radio transmitted signals being communicated to said controller unit;
producing tracking, location and status information signals at the controller unit using said radio transmitted signals received from the antennas;
communicating said tracking, location and status information signals from said controller unit to the first computer server on the home network,
receiving and processing tracking, location and status information signals relating to field assets using said processors at said first computer server, and,
storing and maintaining information relating to said field assets on said first database.

24. The method of transmitting communications regarding the tracking, location and status of field assets in claim 23, wherein said controller unit possesses functional capabilities that include a data collection engine that controls and supports scanning operations and collection of data by and through the controller unit, a data communication engine that controls and supports communication and data transmission operations by and through the controller unit; an RFID reader and multiplexer module that receives and manages the communications with multiple RFID signals using a multiplexed antenna configuration, and a geolocation and tracking engine that controls and supports geolocation, tracking, and status of the controller unit, RFID tags, and field assets associated with RFID tags.

25. The method of transmitting communications regarding the tracking, location and status of field assets in claim 23, wherein said home network has a home agent.

26. The method of transmitting communications regarding the tracking, location and status of field assets in claim 23, wherein said controller unit possesses functional capabilities that include a smartpower engine that manages power consumption of the controller unit, identifies low battery power status, and transitions the controller unit to sleep mode to avoid battery drain; an onboard diagnostics (OBD) engine manages all interactions between the controller unit and a vehicle; a controller device management engine that supports and manages all operational support components associated with the controller unit; and, an operations engine that supports and manages all component service engines and modules in the controller unit.

27. The method of transmitting communications regarding the tracking, location and status of field assets in claim 23, wherein said controller unit has a controller area network bus (CAN-BUS) interface engine that supports two way communications between the controller unit and external devices, said two way communications being capable of remotely controlling and monitoring operations of a remotely located asset or location.

28. The method of transmitting communications regarding the tracking, location and status of field assets in claim 23, further comprising the step of:
communicating between the home and foreign network over the Internet.

29. The method of transmitting communications regarding the tracking, location and status of field assets in claim 23, further comprising the step of:
communicating between the home and foreign network over a radio communication systems.

30. The method of transmitting communications regarding the tracking, location and status of field assets in claim 23, further comprising the step of:

communicating between the home and foreign network over a computer network.

31. The method of transmitting communications regarding the tracking, location and status of field assets in claim 23, wherein said controller unit is coupled to a computer pad located on the foreign network, said computer pad controlling the controller unit and other equipment coupled to the foreign network.

32. The method of transmitting communications regarding the tracking, location and status of field assets in claim 23, wherein said foreign network is a mobile foreign network that is mobile relative to the location of the home network.

33. The method of transmitting communications regarding the tracking, location and status of field assets in claim 23, wherein first computer server is coupled to one or more data entry terminals located on said home network for access to the first computer server, home agent or database memory storage unit on the home network.

34. The method of transmitting communications regarding the tracking, location and status of field assets in claim 23, wherein second computer server is coupled to one or more data entry terminals located on said foreign network for access to the second computer server or controller unit.

35. The method of transmitting communications regarding the tracking, location and status of field assets in claim 23, wherein said home network is coupled to a transceiver through said first gateway providing a communications interface for communications to and from the home network.

36. The method of transmitting communications regarding the tracking, location and status of field assets in claim 23, wherein said foreign network is coupled to a transceiver through said second gateway providing a communications interface for communications to and from the foreign network.

\* \* \* \* \*

UNITED STATES PATENT AND TRADEMARK OFFICE
CERTIFICATE OF CORRECTION

PATENT NO. : 10,979,971 B2  
APPLICATION NO. : 16/490007  
DATED : April 13, 2021  
INVENTOR(S) : Ralph McCoy et al.

Page 1 of 1

It is certified that error appears in the above-identified patent and that said Letters Patent is hereby corrected as shown below:

In the Claims

Claim 1, Line 46 (Column 15, Line 29), after "controller unit" insert --and--
Claim 34, Line 3 (Column 20, Line 5), after "wherein" insert --said--

Signed and Sealed this
First Day of June, 2021

Drew Hirshfeld
*Performing the Functions and Duties of the*
*Under Secretary of Commerce for Intellectual Property and*
*Director of the United States Patent and Trademark Office*